(12) United States Patent
Li et al.

(10) Patent No.: US 12,381,494 B2
(45) Date of Patent: Aug. 5, 2025

(54) MAGNETIC LEVITATION DEVICE AND LINEAR MOTION MECHANISM THEREOF

(71) Applicant: Zhaoqing Heng Yi Industrial Company Limited, Zhaoqing (CN)

(72) Inventors: Liangqing Li, Shenzhen (CN); Xiaobing Wang, Shenzhen (CN)

(73) Assignee: Heng Yi Technology Company Limited, Zhaoqing (CN)

( * ) Notice: Subject to any disclaimer, the term of this patent is extended or adjusted under 35 U.S.C. 154(b) by 804 days.

(21) Appl. No.: 17/641,972

(22) PCT Filed: Sep. 15, 2020

(86) PCT No.: PCT/CN2020/115204
§ 371 (c)(1),
(2) Date: Mar. 10, 2022

(87) PCT Pub. No.: WO2021/057535
PCT Pub. Date: Apr. 1, 2021

(65) Prior Publication Data
US 2022/0311362 A1 Sep. 29, 2022

(30) Foreign Application Priority Data
Sep. 25, 2019 (CN) .......................... 201910908782.1

(51) Int. Cl.
*H02N 15/00* (2006.01)
(52) U.S. Cl.
CPC .................................. *H02N 15/00* (2013.01)
(58) Field of Classification Search
CPC ................................. H02N 15/00; H02K 7/06
See application file for complete search history.

(56) References Cited

U.S. PATENT DOCUMENTS

| 9,564,838 B2 * | 2/2017 | Stipe .......................... G01V 3/40 |
| 2009/0184595 A1 * | 7/2009 | Farber ........................ H01F 7/00 310/90.5 |

(Continued)

FOREIGN PATENT DOCUMENTS

| CN | 1437313 A | 8/2003 |
| CN | 102570927 A | 7/2012 |

(Continued)

OTHER PUBLICATIONS

JPO Notice of Reason for Refusal for Japanese Serial No. 2022-517314; Issued Apr. 19, 2023.

(Continued)

*Primary Examiner* — Thomas E Lazo
(74) *Attorney, Agent, or Firm* — Flener IP & Business Law; Zareefa B. Flener

(57) ABSTRACT

Disclosed are a magnetic levitation device and a linear motion mechanism thereof. The magnetic levitation device is provided with a base and a levitation body, the base comprises a first magnetic assembly, the levitation body comprises a second magnetic assembly, and the first magnetic assembly and the second magnetic assembly are configured to be capable of providing a magnetic balance force required when the levitation body stably levitates relative to the base. The linear motion mechanism is arranged in the base, and comprises: a threaded column installed in a non-displaceable manner relative to the base, wherein at least one part of the threaded column in the length direction of the threaded column is provided with threads; and a displacement support used for supporting the first magnetic assembly of the base, wherein the displacement support is provided with a threaded portion matching the threads of the threaded column, such that when the threaded portion of the displacement support rotates relative to the threaded column, the displacement support generates a corresponding (Continued)

displacement in the length direction of the threaded column. According to the magnetic levitation device, due to the fact that the linear motion mechanism that is simple in structure and reasonable in space layout is used in the base, the whole base is more compact and more reliable in performance.

11 Claims, 3 Drawing Sheets

(56) References Cited

U.S. PATENT DOCUMENTS

| | | | | |
|---|---|---|---|---|
| 2015/0044938 | A1* | 2/2015 | Chieffo | A63H 33/26 446/256 |
| 2018/0175750 | A1* | 6/2018 | Li | H02N 15/00 |

FOREIGN PATENT DOCUMENTS

| | | | |
|---|---|---|---|
| CN | 104796041 A | * | 7/2015 |
| CN | 204887401 U | | 12/2015 |
| CN | 205490246 U | | 8/2016 |
| CN | 108683363 A | | 10/2018 |
| CN | 108923690 A | * | 11/2018 |
| CN | 110572080 A | | 12/2019 |
| CN | 210693804 U | | 6/2020 |
| JP | H08136553 A | | 5/1996 |
| JP | 11108143 A | | 4/1999 |
| JP | 11325213 A | | 11/1999 |
| JP | 2006246263 A | | 9/2006 |
| JP | 2010281417 A | | 12/2010 |
| JP | 3205635 U | | 8/2016 |
| KR | 101769591 B1 | | 8/2017 |
| WO | 2017028812 A1 | | 2/2017 |

OTHER PUBLICATIONS

Supplementary European Search Report for EP 20 87 0057; Issued Sep. 25, 2023.
Decision of Refusal for Japanese app No. 2022-517314; issued Oct. 30, 2023.
International Search Report and Written Opinion of the International Search Authority, PCT/CN2020/115204, Date of mailing Dec. 23, 2020.
Chinese First Office Action, Application No. 201910908782.1, dated Sep. 2, 2021.

* cited by examiner

MAGNETIC LEVITATION DEVICE AND LINEAR MOTION MECHANISM THEREOF

FIELD OF THE ART

The present invention relates generally to magnetic levitation systems.

BACKGROUND OF THE INVENTION

Existing magnetic levitation system, for example, in the form of a desk lamp, a sound box or a globe and the like, generally comprises a magnetic levitation base and a levitating object. The base and the levitating object each comprise a magnet(s), and the magnet in the base can levitate the levitating object at a preset distance above the base through magnetic action (such as magnetic repulsive force) to result in a floating fantastic visual effect which is now popular with people.

However, in realization of levitation of the conventional magnetic levitation system, the levitating object usually needs to be manually placed in a proper levitating position relative to the base, so that the levitating object can float stably. For an initial (inexperienced) user, manually searching the proper levitating position would be difficult and may seem a long process, and they might lose their patience and interest accordingly.

Applicant's patent documents WO2016/202187A1, CN104901587A, CN204687868U, CN205666775U, and the like disclose a magnetic levitation system which comprises a base and a levitating object, wherein the base comprises a magnetic levitator and a lift, and the magnetic levitator having an annular magnet is arranged on the lift and ascends or descends with the lift so as to realize automatic levitating or descending of the levitating object relative to the base.

CN102315805A and CN207202600U also disclose a lifting mechanism for a similar magnetic levitation system, and the height of the whole base is remarkably increased due to the simple up-and-down superposition of the magnetic levitator and the lifting mechanism, such that the miniaturization of the whole system cannot be facilitated.

CN102570927A or CN202503460U also discloses another lifting mechanism for a similar magnetic levitation system, wherein the lifting mechanism having a lifting post and a tray directly protrudes out of the upper surface of the base to lift the levitating object. Such a structure causes the base to be poor in integrity and destroys the wonderful ornamental value presented by the automatic levitating of the levitating object.

SUMMARY OF THE INVENTION

The invention aims to provide a magnetic levitation system such that not only the levitating object of the magnetic levitation system can realize automatic levitating, but also the whole system structure is simple and compact.

As used herein, the term "annular magnet" includes a single ring magnet and a plurality of magnets combined in a ring shape; the term "Threaded stud", or alternatively, a straight screw rod, may refer to a stud either with internal threads or with external threads; the expression "non-displaceably mounted threaded stud relative to the base" means that the threaded stud is non-displaceable with respect to the base but does not preclude rotation of the threaded stud about its own longitudinal axis of rotation; the term "displacement" includes, but is not limited to, vertical lifting motion. Additionally, the terms "magnet" and "ferromagnet" have the same meaning and refer to a magnetic member formed with N and S poles, which may be constructed separately or in combination to form a "magnetic assembly".

According to a first aspect of the invention, a linear motion mechanism or a lifting mechanism for a magnetic levitation system is provided, wherein the magnetic levitation system has a base including a first magnetic assembly and a levitating object including a second magnetic assembly, the first magnetic assembly and the second magnetic assembly being configured to provide a magnetic balance force required for stable levitating of the levitating object relative to the base, and the linear motion mechanism is to be disposed in the base and comprises:

a threaded stud non-displaceably mounted relative to the base, said threaded stud has threads in at least part of its length; and a displaceable support or a lifting support for supporting the first magnetic assembly of the base, the displaceable support is provided with a threaded portion mated with the threads of the threaded stud such that the displaceable support results in a corresponding displacement in the length direction of the threaded stud when there is a relative rotation of the threaded portion of the displaceable support to the threaded stud.

In the present invention, the displaceable support may be integrally formed with or connected to the first magnetic assembly as a whole.

According to embodiments of the present invention, the first magnetic assembly comprises an annular magnet secured to the displaceable support, and the threaded stud passes through the hollow portion of the annular magnet. In this case the linear motion mechanism of the present invention may further include at least one guide rod fixedly mounted relative to the base and spaced parallel to the threaded stud. Preferably, the guide rods also pass through the hollow portion of the annular magnet.

The linear motion mechanism according to the present invention preferably includes an actuator for providing a driving force required for relative rotation of the threaded stud to the threaded portion of the displaceable support.

According to a drive scheme of the present invention, the threaded stud can be rotatably mounted relative to the base, the threaded portion of the displaceable support is integrally formed with the displaceable support or provided by a separate threaded member such as a nut non-rotatably fixed to the displaceable support, and the actuator is fixedly mounted relative to the base and is used to drive the threaded stud to rotate relative to the base.

In the above drive scheme, a worm wheel may be fixedly mounted relative to the base, the threaded stud includes a single threaded stud and the lower end thereof is connected with the worm wheel, the actuator is a motor with an output rotating shaft which is oriented perpendicular to the threaded stud (such that the height of the base is further reduced or the base is more compact) and is fixedly mounted to a worm to be meshed with the worm wheel, such that the worm is driven to rotate through the rotating shaft of the motor and then rotates the worm wheel which in turn rotates the threaded stud. When a single threaded stud is used, the threaded stud preferably passes centrally through the hollow portion of the annular magnet.

In the above drive scheme, a worm wheel and a transmission gear train may be fixedly mounted relative to the base, the transmission gear train includes an upstream gear and at least two downstream gear, the threaded stud includes at least two threaded studs disposed parallel to each other at intervals, the actuator is a motor with an output rotating shaft which is oriented perpendicular to the threaded stud and is fixedly mounted to a worm meshed with the worm wheel, each threaded stud is connected to a respective downstream gear, and the worm wheel meshes or engages with the upstream gear. Thus, under the condition that the worm is driven to rotate by the rotating shaft of the motor, the worm drives the worm wheel to rotate, the worm wheel in turn drives the upstream gear of the transmission gear train to rotate, and the downstream gear finally drives the corresponding threaded stud to rotate. In this case the two threaded studs can symmetrically pass through the hollow part of the annular magnet with respect to the central symmetry axis of the annular magnet.

The drive gear train may or may not include an intermediate gear, so long as the downstream gear can be driven by the upstream gear.

According to an alternative embodiment of the present invention, the actuator is a motor with an output rotating shaft which may also be oriented parallel to the threaded stud and is fixedly mounted to a transmission gear, the threaded stud is fixedly mounted to a concentric gear which is meshed with the transmission gear. Thus, the rotating shaft of the motor drives the transmission gear to rotate, the transmission gear in turn drives the concentric gear to rotate; and the concentric gear finally drives the corresponding threaded stud to rotate.

According to an alternative drive scheme of the present invention, the threaded portion of the displaceable support is provided by a threaded member such as a nut, which is rotatably but non-displaceably mounted (e.g., by a sliding bearing or a rolling bearing) on the displaceable support, the threaded stud is non-rotatably mounted relative to the base and the actuator is fixedly mounted on the displaceable support and is used to drive the threaded member to rotate relative to the threaded stud. In this case it is possible to avoid the displaceable support from rotating so as to avoid the so-called wire-twisting problem.

According to another alternative drive scheme of the present invention, the threaded portion of the displaceable support is integrally formed with the displaceable support or provided by a separate threaded member non-rotatably fixed to the displaceable support, the threaded stud includes a single threaded stud that is non-rotatably mounted relative to the base, the actuator is fixedly mounted on the displaceable support and is used for driving the threaded portion of the displaceable support to rotate relative to the threaded stud. In this case, due to the relative rotation of the displaceable support, the levitating object can automatically be in a rotating state at the moment of separating from the base, that is to say, the levitating object can be in a rotating state for convenient viewing or the like without being further manually stirred.

The linear motion mechanism of the present invention may also include an upper limit switch and a lower limit switch fixedly mounted relative to the displaceable support, respectively.

According to another aspect of the invention, there is also provided a base for the magnetic levitation system, which comprises the above-mentioned linear motion mechanism and a magnetic assembly positioned on the displaceable support of the linear motion mechanism. The base may also include an actuator for controllably driving the linear motion mechanism. The base may further include a controller and other associated electromagnetic elements or the like to control the levitating object in a balanced levitating position relative to the base in real time. The base may furthermore comprise an upper limit switch and a lower limit switch, and the controller may also respectively control the upper limit position and the lower limit position of the linear motion mechanism through the upper limit switch and the lower limit switch.

The controller according to the present invention may be fixedly mounted relative to the base or fixedly mounted on the displaceable support.

According to yet another aspect of the present invention, there is also provided a magnetic levitation system comprising the above-mentioned base and a levitating object having a magnetic assembly, wherein an outer surface (e.g., an upper surface) of the base is provided with a positioning feature for initially positioning the levitating object.

Those skilled in the art will appreciate that various embodiments of the present invention may incorporate features or combinations of features into one another unless explicitly not applicable.

According to the magnetic levitation system disclosed by the invention, since the base incorporates a linear motion mechanism which is simple in structure and reasonable in spatial layout, the whole base is more compact and reliable in performance.

DETAILED DESCRIPTION OF THE PREFERRED EMBODIMENTS

The present invention will now be further described with respect to the examples and drawings. It will be appreciated by those skilled in the art that the examples and drawings are for a better understanding of the invention only and are not intended to be limiting.

Figure 1:
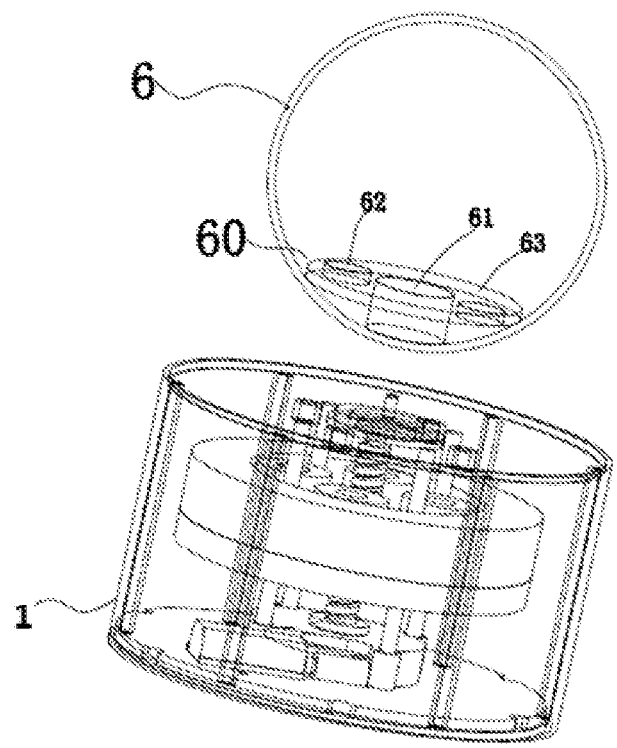
FIG. 1 is an overall schematic view of a magnetic levitation system having a levitating object and a base in accordance with the present invention.

See FIG. 1, The magnetic levitation system according to the present invention generally comprises a levitating object 6 and a base 1. the levitating object 6 is initially located on the upper surface of the base 1, e.g., in a positioning recess thereof, and to be levitated or floated thereon. The levitating object 6 has a magnet assembly 60 which includes a cylindrical permanent magnet 61 and biasing magnets 62 symmetrically arranged on both sides thereof by a fixing plate 63. Due to the biasing magnets 62, the magnet assembly 60 of the levitating object 6 is configured that it is rotationally limited or non-freely rotatable with respect to the magnet assembly of the base 1 during stable levitation and thus can be applied to certain occasions which need to limit the free rotation of the levitating object 6. Alternatively, the biasing magnets 62 may also be symmetrically disposed on the magnet assembly 40 of the base 1, such as on the upper surface of its annular magnet, as described below.

Figure 2:
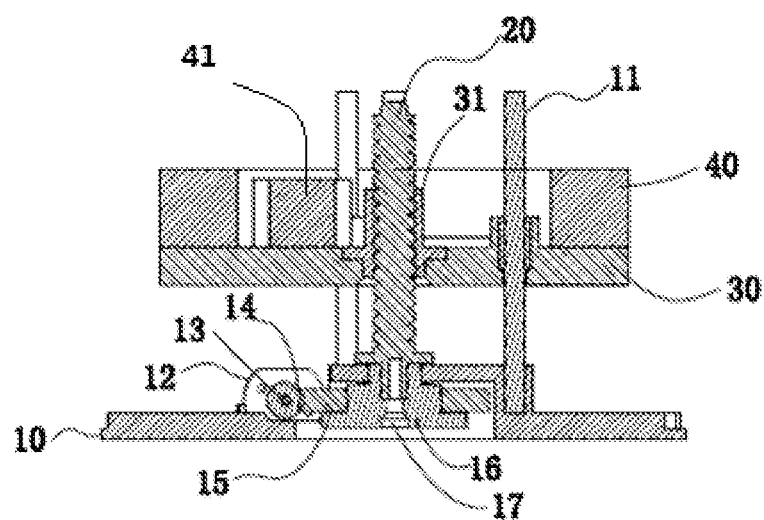
FIG. 2 is a partial cross-sectional view of the base of FIG. 1.

FIG. 2 is a schematic partial cross-sectional view of the base 1 shown in FIG. 1. The base 1 comprises a bottom plate 10, a vertical threaded stud 20 fixed on the bottom plate 10, a tray or a displaceable support 30 in thread-fit connection with the threaded stud 20, and a magnet assembly 40 fixed on the displaceable support 30 and including a ring magnet or magnets arranged in a ring shape. The electromagnetic (control) elements, such as electromagnetic coils 41, and Hall sensors are fixed to the displaceable support 30 and disposed in a hollow portion of the annular magnet with gaps therebetween.

The threaded stud 20 shown in FIG. 2 includes a single one, having threads in its length or its longitudinal direction, with the lower end being mounted on the bottom plate 10 (stationary part) of the base 1, the upper end passing centrally through the hollow (gap) portion of the annular magnet, and the intermediate portion passing in thread fit through the threaded portion or threaded segment 31 of the displaceable support 30. Although the threaded segment 31 of the displaceable support 30 shown in FIG. 2 is provided by a separate hollow threaded member or nut non-rotatably secured to the displaceable support 30, it may also be integrally formed with the displaceable support 30. The lower end of the threaded stud 20 is fixed to a mount 16 by means of a fastener 17 such that they are rotatable together with respect to the bottom plate 10. A motor 12 having a horizontal output shaft 13 is fixedly mounted on the bottom plate 10, the output shaft 13 of the motor 12 is provided with a worm 14 which meshes with a worm wheel 15, and the worm wheel 15 and the mount 16 are fixedly secured together. Thus, when the worm 14 is driven to rotate through the rotating shaft 13 of the motor 12, it drives the worm wheel 15 to rotate, the worm wheel 15 then drives the threaded stud 20 to rotate, and finally, due to the thread fit between the threaded stud 20 and the threaded segment 31 of the displaceable support 30, the displaceable support 30 can move up and down along the threaded stud 20.

FIG. 2 also shows four guide rods 11 extending parallel and evenly around the threaded stud 20 so as to assist in guiding the displaceable support 30 to move up and down along the threaded stud 20. The lower end of each guide rod 11 is also respectively arranged on the bottom plate 10 of the base 1, the upper end respectively passes through the hollow gap of the annular magnet, and the intermediate portion respectively passes through the displaceable support 30 in a sliding way, such that the guide rods 11 have double functions of guiding and also preventing the displaceable support 30 from corotating.

Figure 3:
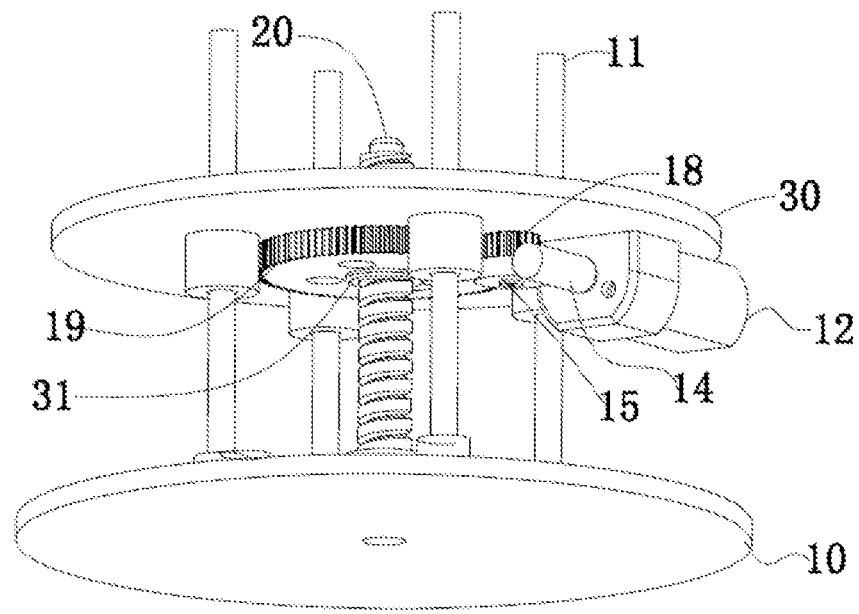
FIGS. 3-5 illustrate various variations of the base embodiment of FIG. 2, respectively.

The embodiment shown in FIG. 3 is a variation of the embodiment shown in FIG. 2, wherein the threaded stud 20 is stationarily mounted on the bottom plate 10, the outer periphery of a threaded segment 31 in the form of a nut mounted on a displaceable support 30 by means of a bearing (not shown) is secured to a big gear 19 which is meshed with a small gear 18, the small gear 18 and the worm wheel 15 are fastened together on top of each other. The motor 12, the worm 14, the worm wheel 15 and the like engage with one another in the same way, but are all arranged on the displaceable support 30. In this embodiment, the threaded stud 20 does not rotate, and the ascending or descending of the displaceable support 30, the magnet assembly 40 and the like is realized by rotating the big gear 19 or the threaded segment 31 up or down to the threaded stud 20.

As an improvement to the embodiment shown in FIG. 3, the guide rods 11 may be omitted, and meanwhile, the bearing omitted and the threaded segment 31 non-rotatably fixed to the displaceable support 30. In doing so, since the threaded stud 20 does not rotate, rotary ascending or descending of the displaceable support 30 and the magnet assembly 40 and the like is achieved by the rotation of the big gear 19 or the threaded segment 31 relative to the threaded stud 20, such that the levitating object 6 can be automatically rotated at the moment of being separated from the base 1 (the levitating object 6 would be in a rotating state for convenient viewing without the need of manually stirring the levitating object 6). In this case, an electric brush mechanism can be additionally arranged between the displaceable support 30 and the threaded stud 20 to avoid the problem of wire twisting (caused by relative rotation of an electric wire for supplying power to a motor 12, an electromagnetic element and the like on the displaceable support 30 to an external stationary power supply).

Figure 4:
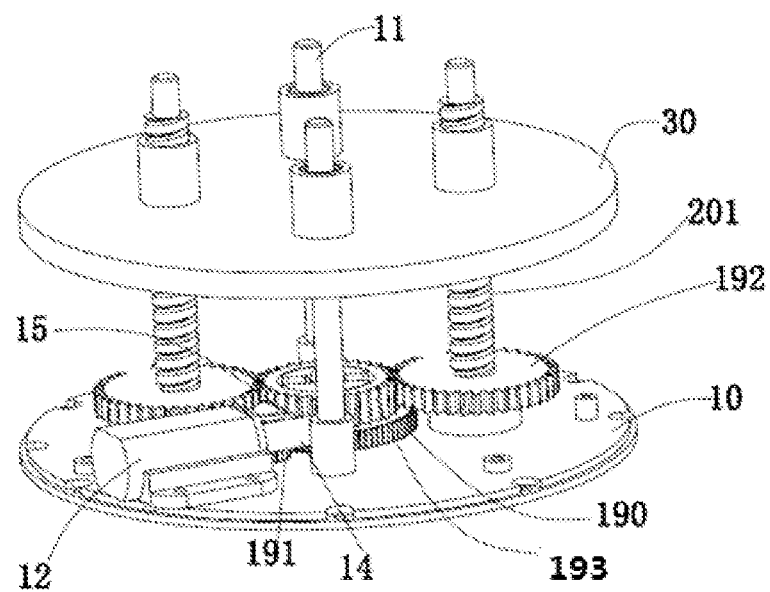

FIG. 4 illustrates another variation of the embodiment of FIG. 2, wherein the centrally disposed single threaded stud 20 shown in FIG. 2 is replaced by two threaded studs 201 shown in FIG. 4, and the two threaded studs 201 are symmetrically arranged in place of the corresponding guide rods 11 shown in FIG. 2, respectively. In this embodiment, the worm wheel 15 and a small gear 191 are fixedly mounted together on top of each other, and the small gear 191 meshes with an intermediate gear 190. A reduction gear 193 and the intermediate gear 190 are fixedly mounted together on top of each other, respectively meshing with big gears 192 on both sides. In this embodiment, since there is no threaded stud disposed centrally through the hollow portion of the annular magnet, interference with the conventional hall sensors or the like generally integrally disposed at the center of the annular magnet will not occur. In addition, using two threaded studs 201 also makes the lifting of the displaceable support 30 more smooth.

Figure 5:
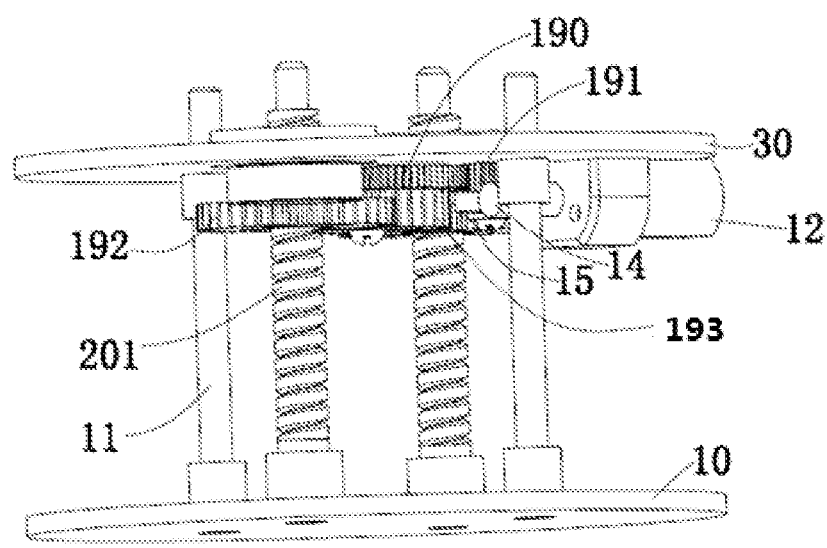

The embodiment shown in FIG. 5 is a modification of the embodiment of FIG. 4, except that the drive mechanism is moved from the bottom plate 10 to the displaceable support 30 as in the embodiment shown in FIG. 3, thus likewise having the advantage of smoothness in lifting.

Of course, although not shown, the base 1 may also include a controller and upper and lower limit switches to control the upper and lower limit positions of the linear motion mechanism.

Those skilled in the art will appreciate that the various directional terms described above including "upper", "lower", and the like, are merely intended to illustrate and not to limit the invention in conjunction with the embodiments shown in the accompanying drawings. Indeed, for such a magnetic levitation arrangement, for example, with reference to Applicants' patent CN1819436B, the levitating object is not only capable of vertically and stably being levitated above the base, but also capable of stably being levitated in a relatively inclined position, for example, where the angle between the horizontal plane and the center-of-gravity line passing through the cylindrical magnet of the levitating object and the annular magnet of the base is in the range of 0-90 degrees; this is because the influence of gravity of the levitating object can be completely counteracted by the real-time balanced magnetic field formed by the magnetic levitation system.

What is claimed is:

1. A linear motion mechanism for a magnetic levitation system, wherein the magnetic levitation system has a base including a first magnetic assembly and a levitating object including a second magnetic assembly, the first magnetic assembly and the second magnetic assembly being configured to provide a magnetic balance force required for stable levitation of the levitating object relative to the base, and the linear motion mechanism is to be disposed in the base and comprises:

at least one threaded stud non-displaceably mounted relative to the base, the at least one threaded stud has threads in at least part of its length;

a displaceable support for supporting the first magnetic assembly of the base, the displaceable support is provided with a threaded portion mated with the threads of the at least one threaded stud such that the displaceable support results in a corresponding displacement in the length direction of the at least one threaded stud when there is a relative rotation of the threaded portion of the displaceable support to the at least one threaded stud; and at least one guide rod fixedly mounted relative to the base and disposed parallel to the at least one threaded stud, wherein the first magnetic assembly comprises an annular magnet secured to the displaceable support, and the at least one threaded stud and the at least one guide rod each pass through the hollow portion of the annular magnet.

2. The linear motion mechanism of claim 1, further comprising an actuator for providing a driving force required for relative rotation of the at least one threaded stud to the threaded portion of the displaceable support.

3. The linear motion mechanism of claim 2, wherein the at least one threaded stud is rotatably mounted on the base about its longitudinal axis of rotation, the threaded portion of the displaceable support is integrally formed with the displaceable support or provided by a separate threaded member non-rotatably secured to the displaceable support, and the actuator is fixedly mounted relative to the base and is adapted to drive the at least one threaded stud to rotate relative to the base.

4. The linear motion mechanism of claim 3, wherein the at least one threaded stud is a single threaded stud passing centrally through the hollow portion of the annular magnet of the first magnetic assembly.

5. The linear motion mechanism of claim 3, wherein the at least one threaded stud includes at least two parallel threaded studs.

6. The linear motion mechanism of claim 2, wherein the threaded portion of the displaceable support is provided by a separate threaded member rotatably but non-displaceably mounted on the displaceable support, the at least one threaded stud is non-rotatably mounted relative to the base, and the actuator is fixedly mounted on the displaceable support for driving the threaded member to rotate relative to the at least one threaded stud.

7. The linear motion mechanism of claim 6, wherein the at least one threaded stud includes two mutually parallel threaded studs and the displaceable support is also provided with two corresponding threaded portions.

8. The linear motion mechanism of claim 2, wherein the threaded portion of the displaceable support is integrally formed with the displaceable support or provided by a separate threaded member non-rotatably secured to the displaceable support, the at least one threaded stud is a single threaded stud non-rotatably mounted relative to the base, and the actuator is fixedly mounted on the displaceable support and drives the threaded portion of the displaceable support to rotate relative to the at least one threaded stud.

9. A base for a magnetic levitation system comprising a linear motion mechanism according to claim 1 and a magnetic assembly on the displaceable support of the linear motion mechanism.

10. The base of claim 9, further comprising an actuator for controllably driving the linear motion mechanism.

11. A magnetic levitation system comprising a base according to claim 9 and a levitating object having a magnetic assembly, wherein an outer surface of the base is provided with a positioning feature for initially positioning the levitating object.

* * * * *